J. WEBER.
WHIFFLETREE GUARD.
APPLICATION FILED DEC. 5, 1914.
1,143,924.
Patented June 22, 1915.
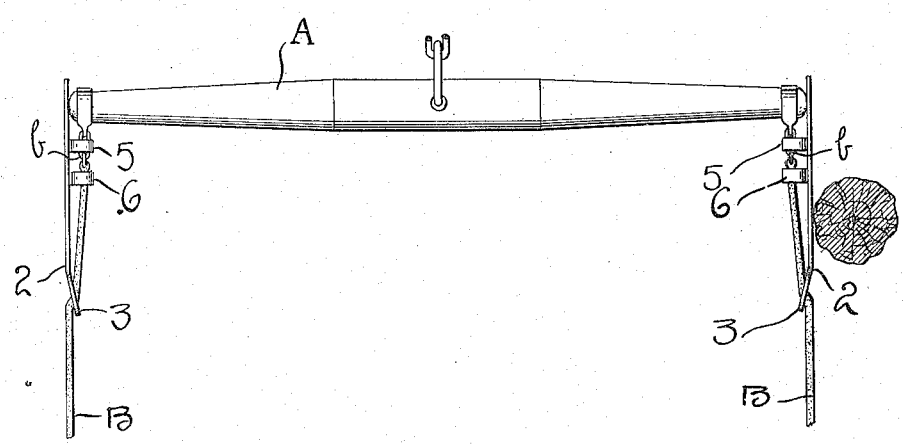
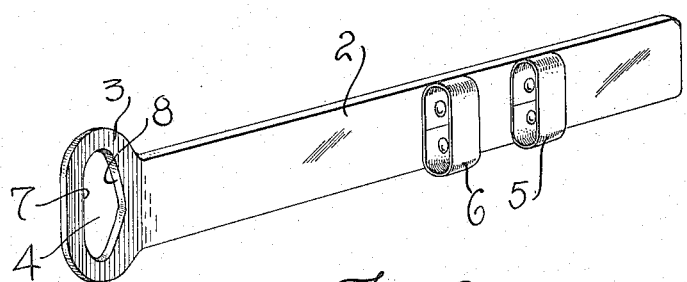
Witnesses
Robert M. Sutphen
A. J. Huid
Inventor
JOHN WEBER
By Watson E. Coleman
Attorney

UNITED STATES PATENT OFFICE.

JOHN WEBER, OF ELBA, NEW YORK.

WHIFFLETREE-GUARD.

1,143,924.

Specification of Letters Patent.

Patented June 22, 1915.

Application filed December 5, 1914. Serial No. 875,708.

*To all whom it may concern:*

Be it known that I, JOHN WEBER, a citizen of the United States, residing at Elba, in the county of Genesee and State of New York, have invented certain new and useful Improvements in Whiffletree-Guards, of which the following is a specification, reference being had to the accompanying drawings.

My invention relates to devices adapted to be applied to whiffletrees for the purpose of preventing the ends of the whiffletrees from scraping or scoring the bark of trees or catching in wire fences.

In plowing or cultivating in orchards or where fruit trees are planted, or in plowing or cultivating adjacent to wire fences the ends of the whiffletree or swingletrees are very likely to damage the fruit trees by scoring the bark and tearing it. Furthermore, where working closely adjacent to a wire fence the ends of the whiffletrees are liable to catch in the meshes of the fence.

This is a great inconvenience and a source of considerable damage, and the main object of my invention is to obviate this inconvenience and damage by providing a shield adapted to be so mounted as to cover the projecting end of the whiffletree, and so formed as to prevent any possibility of the whiffletree catching against an object.

A further object of the invention is to construct this protecting shield very simply and cheaply, and so form it that it may be readily removed or applied when desired.

Other objects will appear in the course of the following description.

My invention is illustrated in the accompanying drawings, wherein—

Figure 1 is a plan view of a swingletree with my shields applied; Fig. 2 is a perspective view of one of the shields.

Corresponding and like parts are referred to in the following description and designated in all parts of the accompanying drawings by like reference numerals.

Referring to these figures, A designates a swingletree and B the traces therefor, it being understood that this swingletree is applied to a plow, cultivator, or any other draft operated device or mechanism.

The improved shield, as illustrated in Fig. 2 consists of a strip of metal 2, elongated in relation to its width, the forward end of which is inwardly deflected as at 3, this inwardly deflected end being preferably wider than the width of the shield 2 and being formed with a transversely extending slot 4 through which the trace B is adapted to pass, as illustrated clearly in Figs. 1.

Carried by and formed upon the rear end of the strip 2 is a loop 5, preferably formed as illustrated of a narrow strip of material, the ends of which are brought together to form a loop and are riveted to the shield 2. This loop 5 is placed about eight inches from the rear end of the shield plate or strip, and preferably there are two of these loops, the second being designated 6, disposed relatively near together. The rear end of the trace passes through these loops so as to support the shield with its end extending over the end of the whiffletree. Preferably trace chains *b* pass through the rearmost loop.

The forward end of each shield is deflected inward, as previously stated, but this deflection is not so great as to bring the portion 3 at right angles to the plane of the shield 2, but is relatively slight so that when the trace B is placed through the loop and the rear end of the trace is threaded through the loops 5 and 6, the body of the trace will be gripped between the forward wall 7 of the opening 4 and the rear wall 8, thus causing the shield to be held in place against longitudinal movement. This deflected head 3 of the shield thus not only acts to hold the shield in place upon the trace, but the inclined outer surface thereof contacts with the wires of a fence, a fence post or a tree and slides against the surface of the wood or metal and tends to deflect the swingletree inward and prevent its end from tearing the bark of the tree or becoming tangled with and catching on the wires of the fence.

The reason for providing two loops 5 and 6 on the shield is that where only one loop is used, when this loop 5 passes beyond the leather portion of the trace and rests on the body of the trace, and the hook of the whiffletree, this being narrower than the trace will permit the shield to drop downward for the width of the loop so that the shield will not be on a level with the end of the whiffletree. By using the second loop, however, as the loop 6, the loop will remain on the wide or leather part of the trace and will hold the shield up in proper place.

It will of course be obvious that while I have shown the shield as formed of a single integral piece, it might be made of a number of pieces riveted to each other, and that the stock may have a different shape in cross section.

My device is extremely simple, is readily applied, is adaptable to all forms of draft devices where trace chains or trace straps are used, and may be quickly changed from one side or the other if two of these shields are not desired to be used.

Having described my invention, what I claim is:

1. A shield for whiffletrees of the character described, comprising a strip having its forward end inwardly deflected and transversely slotted for the passage of a trace, the rear portion of the shield being formed upon its inside face with a loop through which the trace is adapted to pass.

2. A shield of the character described, comprising a strip of metal, the forward end of which is laterally enlarged and deflected at an angle to the plane of the body of the strip, this deflected portion being slotted transversely to the length of the strip for the passage of a trace, the inner face of the shield adjacent its rear end being provided with a loop through which the trace is adapted to pass.

3. A shield of the character described, including a strip of metal deflected at its forward end at an angle to the plane of the strip less than a right angle, said forward end being slotted transversely to the length of the strip to provide oppositely disposed trace gripping walls extending at right angles to the length of the strip, the strip on its inner face adjacent its rear end being provided with a loop for the passage of a trace.

4. A shield for whiffletrees comprising a strip having its forward end deflected and slotted for the passage of the trace, the rear portion of the shield being formed upon its inside face with a plurality of spaced loops through which the trace is adapted to pass.

5. A shield for whiffletrees comprising a strip of metal having its forward end inwardly deflected, this deflected portion having an opening for the passage of a trace, the rear portion of the shield being formed upon its inside face with a loop through which the trace is adapted to pass.

In testimony whereof I hereunto affix my signature in the presence of two witnesses.

JOHN WEBER.

Witnesses:
MARTIN HULL,
WILLIAM B. WEBER.

Copies of this patent may be obtained for five cents each, by addressing the "Commissioner of Patents, Washington, D. C."